Dec. 3, 1940.  W. VERHEY  2,223,587
METHOD OF MAKING PLYWOOD SHELLS
Filed April 1, 1938
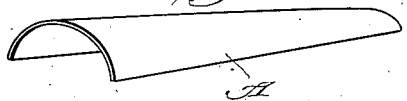
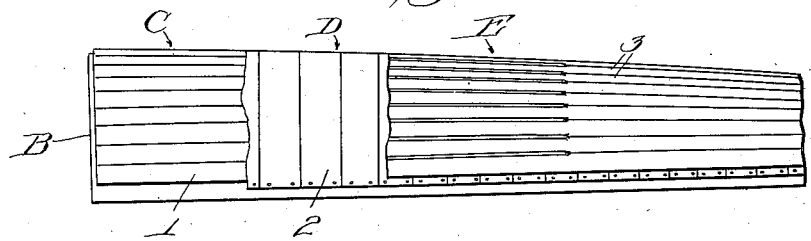
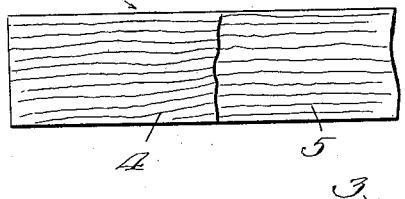
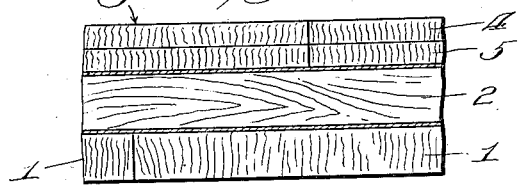
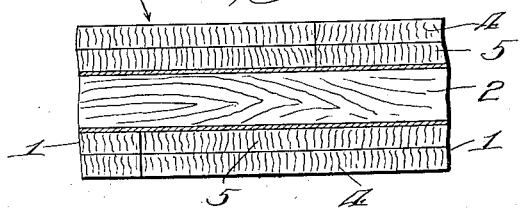
Inventor:
William Verhey
by [signature] Atty.

Patented Dec. 3, 1940

2,223,587

UNITED STATES PATENT OFFICE 2,223,587

METHOD OF MAKING PLYWOOD SHELLS

William Verhey, Grand Rapids, Mich., assignor, by mesne assignments, to John F. Neary, Jr., Englewood, N. J., as trustee Application April 1, 1938, Serial No. 199,333

3 Claims. (Cl. 144—309)

In a patent application of O. H. Basquin, Serial No. 187,864, there is disclosed a method of forming large plywood shells or panels whose surfaces are curved in two directions transverse to each other. In accordance with that method, each ply is composed of numerous long, narrow strips of veneer arranged edge to edge; the strips being cut to pattern at a time when the veneers have a predetermined moisture content; and the first heavy pressure in the molding and bonding process being applied to the assembly of rudimentary plies at a time when the moisture control of the veneers has that same value. In other words, it is important that the pieces of veneer have exactly the same sizes and shapes at the time of first applying heavy pressure in the molding and bonding operation as at the time of cutting out the strips; and, consequently, anything that prevents this reduces the efficiency of the process and the quality of the product.

One difficulty that has been experienced in connection with the aforesaid process results from the fact that even in supposedly straight-grained wood the grain may be wavy or otherwise irregular in spots. The variation in grain means a variation in the structure of the wood and a difference in the contraction and expansion, under changes in moisture content, in different areas of a piece of veneer. In the case of mahogany veneer, for example, used in the face plies of air craft fuselage shells, it is rarely quite flat, but is usually spotted with bulging areas of various sizes and shapes. This makes it difficult to cut the veneer accurately to pattern in the first place, and may cause trouble during the later molding and bonding, particularly where the flattening of the bulges makes a piece of veneer wider at some point than it should be.

The object of the present invention is substantially to overcome the aforesaid difficulty in a simple and comparatively inexpensive manner.

In accordance with my invention, instead of forming a face ply of veneer of a predetermined thickness, I bond together two thin veneers whose combined thickness may be equal to, greater or less than said predetermined thickness and cut the desired pieces from this compound material. The essential thing, however, is that the grain of the wood in both of the layers of the composite sheet shall run in the same general direction. In that event, unless two consecutive pieces sliced from the same log are laid upon each other in the same relative positions occupied in the log, there is inevitably some crossing of the grains in the two veneers. Since the general direction of the grain in the two layers is the same, the composite sheet can be bent in the manner of a sheet of veneer of the same thickness, but it will not crack or spilit as easily. What is most important, however, is the fact that bulging spots in one layer are apt to register with flat areas or areas that bulge in the opposite direction in the other layer; so that the composite sheet, formed under heavy pressure, is much flatter than a sheet of simple veneer of the same thickness. Consequently, I am able to cut pieces to pattern from my composite sheets with the assurance that these pieces will fit properly in the respective areas assigned to them in a face ply of a shell or panel of compound curvature, and that there will be less danger of cracking of the material in the handling thereof prior to and during molding operations.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is a perspective view of a large plywood panel having its surface curved in two directions at right angles to each other, adapted to form one-half of a fuselage shell, embodying the present invention; Fig. 2 is a side view illustrating the arrangement of the various plies upon a convex die or form, preparatory to molding and bonding the plies to produce the product shown in Fig. 1; Fig. 3 is a plan view of a fragment of one of the composite face strips, the upper layer being broken away at one end to expose the layer underneath; Fig. 4 is an end view of the strip appearing in Fig. 3, but on a larger scale; Fig. 5 is a view looking at the righthand edge of the panel of Fig. 1, only a small fragment being shown, and the scale being much greater; and Fig. 6 is a view similar to Fig. 5, showing the ply on the inner or concave side, as well as the outer or face ply, composed of the composite material illustrated in Figs. 3 and 4.

In the drawing I have illustrated my invention as applied to the manufacture of and embodied in a plywood structure constituting one-half of an air craft fuselage shell, in connection with which the invention is of peculiar importance; and, for the sake of brevity, the detailed description will be confined to this particular embodiment. So, also, the detailed description will be confined to a three-ply panel, such as illustrated, although the number of plies is a matter of choice and depends upon the service to be performed by the panel.

In order to produce the plywood panel A of Fig. 1, that has its surface curved lengthwise and also across the width of the panel, strips are cut to pattern and assembled edge to edge in their respective plies, to form a rudimentary panel of compound curvature disposed over a suitable die or form B of the proper shape. In the arrangement shown, there are three plies C, D and E, arranged in that order upon the die or form. The inner ply is composed of strips 1 extending throughout the length of the form; the intermediate or core ply is composed of strips 2 extending crosswise and bent into more or less U shape; and the outer ply is made up of strips 3 that extend lengthwise of the form as do the strips 1. The grain of the wood in the strips 1 and 3 runs lengthwise of the strips and therefore lengthwise of the form, and the grain of the wood in the strips 2 runs in the direction of their lengths and, therefore, crosswise of the die or form.

The several rudimentary plies, with a suitable bonding material interposed between them are assembled on the die or form, and pressure and heat are applied to mold the veneers to the contour of the form and to effect the bonding of the veneers into a unitary structure.

In accordance with the present invention, instead of employing veneer, say of mahogany wood, perhaps one-twentieth of an inch thick, in both of the plies C and E, I first produce a composite sheet by bonding together two sheets of veneer of only half that thickness, or even less. Thus, in the case of the example given, where a simple veneer one-twentieth of an inch thick would be required, I have bonded together two thin veneers about one-forty-eighth of an inch thick. The grain in these two thin veneers must run in the same general direction which, in the present instance, is lengthwise of the pieces that are cut from the composite material to form the strips 3. Thus, each of the strips 3 has the composite form illustrated in Figs. 3 and 4, comprising two thin veneers 4 and 5, lying one upon the other and firmly bonded together. No two pieces of veneer have grain exactly alike or of the same pattern and, therefore, even though the grain in each layer of veneer in the strip may be said to run lengthwise of the strip, there is more or less crossing of the grain in one layer with respect to that in the other, so that each layer, to some extent, reenforces the other against splitting or cracking.

In slicing veneer, as distinguished from rotary cutting, the various plies are piled up in the exact order in which they were cut from the log or, rather, the flitch, so that all of the veneer sheets or strips occupy the same relative positions to each other as they did in the log.

One method of assembling the two veneer sheets I have used with especial success is as follows: two veneer slices from the same log are laid upon each other in the same relative positions occupied in the log, then one of them is turned over about an axis extending in the general direction of the grain, so that its back surface is against the back surface of the adjacent, unturned sheet. The grain directions of the two veneers are thus effectively mismatched or thrown out of register, which materially increases the transverse strength of the two-ply sheet resulting from bonding the veneers together.

The bonding together of the thin veneers 4 and 5 should be carried out under heavy pressure, preferably with thermosetting adhesive, so as to secure a flattening of the material in the composite sheet and a substantial elimination of such bulges as may have existed in the simple veneers.

When the strips 3 are cut from the composite material at a time when the latter has a predetermined moisture content, they do not have the objectionable characteristics of pieces or strips cut from simple veneer, to which reference has previously been made. Consequently, the process of making a curved panel or shell is facilitated, there is less cracking or breaking of the face veneer, and the surface of the completed panel is smooth and even.

In Fig. 5 the construction is illustrated as one in which the strips 1 are composed of a single thickness of veneer, whereas in Fig. 6, the strips 1 are formed like the strips 3, namely of two layers 4 and 5 in each of which the wood grain runs in the same general direction although, of necessity, more or less out of registration.

It will, of course, be understood that while my improved method will usually be carried out by forming one or both face plies of two thicknesses of veneer, the invention is not limited to this particular number of thicknesses, but contemplates any desired plural number thereof.

I claim:

1. The method of producing a multiple-ply wood veneer member whose surface is curved in two directions transverse to each other, which consists in forming face material by bonding together and pressing into a flat state two thicknesses of thin wood veneer lying one upon the other and having their grains running in the same general direction but out of registration with each other, cutting from such material a group of strips which, when placed edge to edge, have a combined area equal to a surface which said member is to have, placing said strips loosely in edge to edge relation to each other to form a rudimentary ply having roughly the shape of a face ply for said member, assembling said rudimentary ply and wood veneers adapted to form the remaining plies of said member, with bonding material interposed between each ply and the adjacent ply or p'ies, and subjecting the assembly to shaping and bonding conditions.

2. The method of producing a multiple-ply wood veneer shell whose surface is curved in two directions transverse to each other which consists in forming face material by bonding together and pressing into a flat state two thicknesses of thin wood veneer lying one upon the other and having their grains running in the same general directions but out of registration with each other, cutting from such material, while in a dry state, a group of strips which, when placed edge to edge, form a rudimentary ply having roughly the shape of a face ply for said member, having a surface area equal to that which said member is to have, placing said strips loosely in edge to edge relation to each other in an assembly with veneers to form the remainder of the plies, with dry thermosetting bonding material interposed between each ply and the adjacent ply or plies, and subjecting the assembly, while dry, to shaping and bonding conditions that include heat and pressure.

3. The method of producing a multiple-ply wood veneer whose surface is curved in two directions transverse to each other, which consists in forming face material by laying upon each other, bonding together and pressing into a flat state a plurality of pieces of veneer that were overlying and were adjacent to each other in a log, with the grain running in the same direction and faces that were spaced apart from each other in the log engaged with each other, cutting from such material a group of strips which, placed edge to edge, form a rudimentary face ply having a surface area equal to a surface which said member is to have, and approximating in shape a face ply for said member, placing said strips in loose edge to edge relation to each other in an assembly, with veneers that are to form the remainder of the plies, suitable bonding material being interposed between each ply and the adjacent ply or plies, and subjecting the assembly to shaping and bonding conditions.

WILLIAM VERHEY.